(12) United States Patent
Katahira

(10) Patent No.: US 6,684,290 B2
(45) Date of Patent: Jan. 27, 2004

(54) MEMORY REWRITING APPARATUS AND METHOD FOR MEMORY MAPPING REWRITING PROGRAM TO SAME ADDRESS SPACE

(75) Inventor: Shunsuke Katahira, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 168 days.

(21) Appl. No.: 09/978,784

(22) Filed: Oct. 18, 2001

(65) Prior Publication Data

US 2003/0167371 A1 Sep. 4, 2003

(51) Int. Cl.⁷ .............................................. G06F 12/00
(52) U.S. Cl. ....................... 711/103; 710/262; 710/305; 714/42; 717/168
(58) Field of Search ................... 711/103; 710/262, 710/305; 714/42; 717/168

(56) References Cited

U.S. PATENT DOCUMENTS

| | | | |
|---|---|---|---|
| 5,603,056 A | * | 2/1997 | Totani ............................. 710/8 |
| 6,148,362 A | * | 11/2000 | Sagi ............................. 711/102 |
| 6,341,239 B1 | * | 1/2002 | Hayashi et al. ................ 700/79 |
| 6,349,397 B1 | * | 2/2002 | Koga et al. .................. 714/727 |
| 2002/0129195 A1 | * | 9/2002 | Hongo et al. ................ 711/104 |
| 2003/0041217 A1 | * | 2/2003 | Terada et al. ................ 711/154 |

FOREIGN PATENT DOCUMENTS

| | | |
|---|---|---|
| JP | 8-185354 | 7/1996 |
| JP | 10-149282 | 6/1998 |
| JP | 2001-92649 | 4/2001 |

* cited by examiner

*Primary Examiner*—Reba I. Elmore
(74) *Attorney, Agent, or Firm*—Foley & Lardner

(57) ABSTRACT

A memory rewriting apparatus is provided which does not require ROMs other than a flash ROM while enabling use of interrupts, and in which a program for switching between a normal operation and a program rewriting operation is not complicated. In the memory rewriting apparatus of the present invention, a CPU 10 includes a port output terminal PT and selection output terminals CS0, CS1 and CS2. A memory map switching circuit 20 is provided which is connected with those output terminals, a flash ROM and a RAM. The CPU sets the port output terminal to an "L" level in a normal operation, and to an "H" level at the time of rewriting a flash ROM program, so that a memory map takes a condition as shown in FIG. 2(*a*) in the normal operation, whereas it takes another condition as shown in FIG. 2(*c*) in the program rewriting operation. Here, a program for rewriting a high address can rewrite the flash ROM program in a middle address, and execute an interrupt which is generated even in the course of the program rewriting operation since a memory area of the active rewriting program and a memory area being rewritten are different from each other.

8 Claims, 2 Drawing Sheets

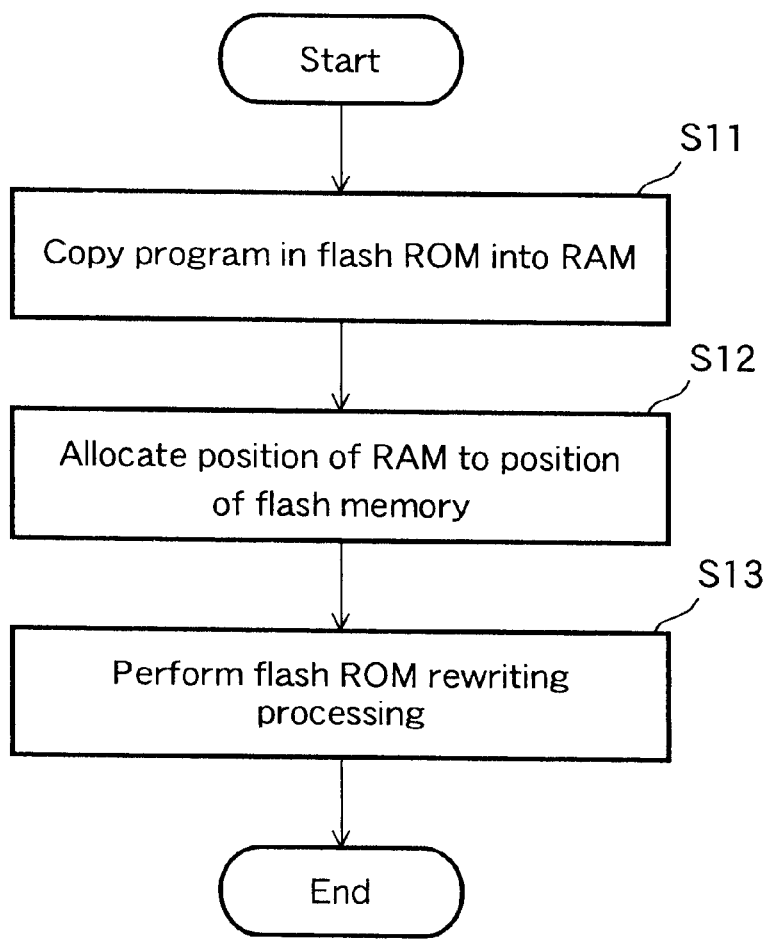

MEMORY REWRITING APPARATUS AND METHOD FOR MEMORY MAPPING REWRITING PROGRAM TO SAME ADDRESS SPACE

BACKGROUND OF THE INVENTION

1. Field of the Invention

This invention relates to a memory rewriting apparatus capable of easily rewriting a memory, and more specifically, it relates to a memory rewriting apparatus at least including a CPU, a RAM, and a nonvolatile memory in which nonvolatile memory programs including various control programs and a rewriting program for rewriting the control programs are stored, whereby when a program update command requesting rewriting of the nonvolatile memory programs is received from the exterior, the memory rewriting apparatus rewrites the nonvolatile memory programs by using the rewriting program stored in the nonvolatile memory.

2. Description of the Related Art

Such a kind of memory rewriting apparatus updates programs by receiving program data from the outside, and rewriting the contents of the nonvolatile memory. (Here, a flash ROM is taken as a typical example.) In this case, even if there arises the necessity of reading the contents of the flash ROM during the time when the contents of the flash ROM are being rewritten, it would be impossible to perform reading out the contents thereof. Thus, in order to solve such an inconvenience, the following measures were taken in the past That is, (1) A rewriting program for rewriting the contents of a flash ROM is stored in advance in a ROM different from the flash ROM.

(2) A rewriting program is stored in a flash ROM, so that the rewriting program is transferred to a RAM upon rewriting, and is run on the RAM.

(3) A rewriting program is stored in a flash ROM, so that the rewriting program is transferred to a RAM upon rewriting, and then memory maps in the flash ROM and the RAM are exchanged with each other (for instance, see Japanese Patent Application Laid-Open No. 8-185354).

However, the above measures involve the following problems. That is,

In case of (1) above, an additional ROM other than the flash ROM is needed.

In case of (2) above, when an interrupt address is allocated to the flash ROM, data cannot be read upon generation of an interrupt. In other words, interrupt processing cannot be used.

In case of (3) above, though interrupt processing can be used, the positions of the RAM and the flash ROM are mutually exchanged with each other between during normal operation and at the time of rewriting the flash ROM program, so a control or switching program becomes complicated.

SUMMARY OF THE INVENTION

This invention is intended to solve the problems as referred to above, and has for its object to provide a memory rewriting apparatus which does not require an additional ROM separately from a flash ROM, and which can use interrupt processing while utilizing a non-complicated program for switching between normal operation and rewriting of the flash ROM.

In order to solve the above-mentioned problems, a memory rewriting apparatus according to the present invention comprises: a copying unit for copying a rewriting program stored in a nonvolatile memory into a RAM upon receipt of an instruction for rewriting the nonvolatile memory; a RAM allocation unit for allocating the RAM, into which copying is carried out by the copying unit, to an area of the nonvolatile memory; and a rewriting execution unit for rewriting the nonvolatile memory by using the rewriting program stored in the RAM allocated by the RAM allocation unit.

According to such a configuration, the contents of the nonvolatile memory can be rewritten by executing the contents of the nonvolatile memory while using the rewriting program stored in the RAM similarly to the execution of the rewriting program stored in the nonvolatile memory, as a result of which it becomes easy to rewrite the nonvolatile memory.

Moreover, a memory rewriting apparatus according to the present invention comprises: a copying unit for copying, upon receipt of an instruction for rewriting a nonvolatile memory, a rewriting program stored in the nonvolatile memory into a first area of a RAM; a RAM allocation unit for allocating the RAM, into which copying is carried out by the copying unit, to an area of the nonvolatile memory; a rewriting execution unit for rewriting the nonvolatile memory by using the rewriting program stored in the RAM allocated by the RAM allocation unit; and a use permission unit for permitting a second area of the RAM to be used as a RAM area upon execution by the rewriting execution unit.

According to such a configuration, the RAM can be used even in the course of rewriting thereof as in the normal operation in which rewriting of the RAM is not executed.

In addition, the present invention resides in a memory rewriting apparatus including at least a CPU, a RAM and a nonvolatile memory which stores therein nonvolatile memory programs including various control programs and a rewriting program for rewriting the various control programs, wherein the apparatus rewrites, upon receipt of a program update command requesting rewriting of the nonvolatile memory programs from the outside, the nonvolatile memory programs by using the stored rewriting program, the apparatus comprising: a memory map switching unit connected with the CPU, the RAM and the nonvolatile memory and adapted to allocate the RAM and the nonvolatile memory to a memory map for a normal operation when it receives from the CPU an instruction indicative of a normal operation time other than a program rewriting operation time, and allocate, upon receipt of an instruction indicative of a program rewriting operation time, the RAM not only to the memory map area but also to another memory map area to which the nonvolatile memory is allocated in the normal operation while moving the nonvolatile memory to a memory map area other than the two memory map areas in which the RAM is allocated and a rewriting execution unit adapted to operate in such a manner that the CPU can copy into the RAM the nonvolatile memory programs stored in the nonvolatile memory that is in a memory map for the normal operation, then generate an instruction indicative of a program rewriting operation, and rewrite the nonvolatile memory programs in the nonvolatile memory which has been moved to the memory map area other than the two memory map areas where the RAM is allocated, in accordance with the rewriting program copied into the RAM allocated to the nonvolatile memory area for the normal operation.

According to such a configuration, the rewriting of the nonvolatile memory programs is carried out by rewriting the nonvolatile memory programs allocated in the areas other than the two areas where the RAM has been allocated by the rewriting program that is copied into the RAM and allocated to the area of the nonvolatile memory at time of normal operation. Accordingly, the CPU understands that only the area where the nonvolatile memory to be rewritten exists has been moved, and that the rewriting program and the RAM do not change their existing areas. As a result, the rewriting program does not become complicated. In addition, even if an interrupt is generated during the program rewriting operation, it can be executed since the area in the memory map of the active rewriting program and the area of the program to be rewritten are different from each other.

Further, in the present invention, the nonvolatile memory comprises a flash ROM, and the CPU has a port output terminal and a first through a third selection output terminal. The memory map switching unit is connected, on one hand, with the port output terminal and the first through third selection output terminals of the CPU, respectively, and, on the other hand, with the flash ROM and the RAM, respectively. The rewriting execution unit comprises a rewriting execution control program given to the CPU, and the CPU sets its port output terminal to a first logic at the time of the normal operation, and to a second logic at the time of rewriting the flash ROM program in accordance with the rewriting execution control program. In addition, the CPU sets it first selection output terminal to the first logic when a low address area is selected, and to the second logic when non-selection is made, and it also sets the second selection output terminal to the first logic when a middle address area is selected, and to the second logic when non-selection is made, and it further sets the third selection output terminal to the first logic when a high address area is selected, and to the second logic when non-selection is made. In the case where the port output terminal is set to the first logic, the memory map switching unit permits the access of the CPU to the RAM when the first selection output terminal is set to the first logic, refuses the access of the CPU to the flash ROM or the RAM in accordance with the logic of the second selection output terminal, and permits the access of the CPU to the flash ROM when the third selection output terminal is set to the first logic. On the other hand, in the case where the port output terminal is set to the second logic, the memory map switching unit permits the access of the CPU to the RAM when the first selection output terminal is set to the first logic, permits the access of the CPU to the flash ROM when the second selection output terminal is set to the first logic, and permits the access of the CPU to the RAM when the third selection output terminal is set to the first logic.

Still further, in the present invention, the memory map switching unit comprises a logical circuit which is connected at its input side with the port output terminal and the first through third selection output terminals, and at its output side with the RAM and the flash ROM.

BRIEF DESCRIPTION OF THE DRAWINGS

FIG. 2($b$) is a view illustrating a memory map in which the contents of the flash ROM are copied into the RAM by means of a CPU shown in FIG. 1.

FIG. 2($c$) is a view illustrating a memory map as set by cooperation of the CPU and the memory map switching circuit of FIG. 1 upon rewriting a flash ROM program.

FIG. 3 is a flow diagram explaining a change in the memory maps of FIGS. 2($a$) through 2($c$).

DESCRIPTION OF THE PREFERRED EMBODIMENT

Figure 1:
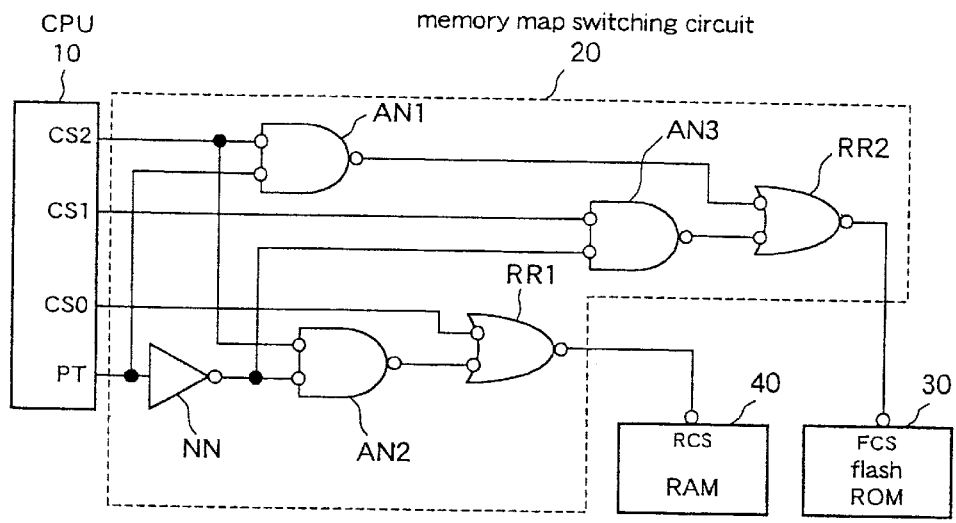
FIG. 1 is a block diagram of an embodiment of a memory rewriting apparatus according to the present invention, illustrating the configuration of essential portions of a control circuit of the memory rewriting apparatus.
Figure 2:
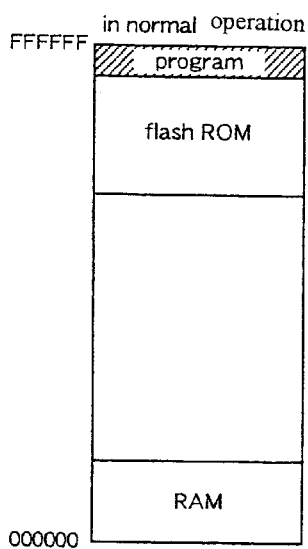
FIG. 2($a$) is a view illustrating a memory map of a flash ROM and a RAM of the control circuit of the memory rewriting apparatus in the normal operation.
Figure 2:
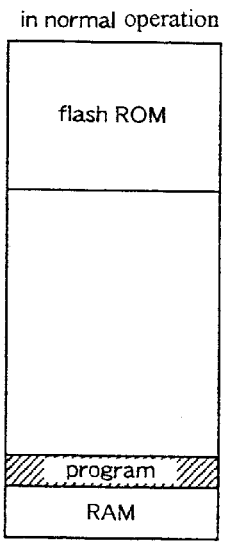
Figure 2:
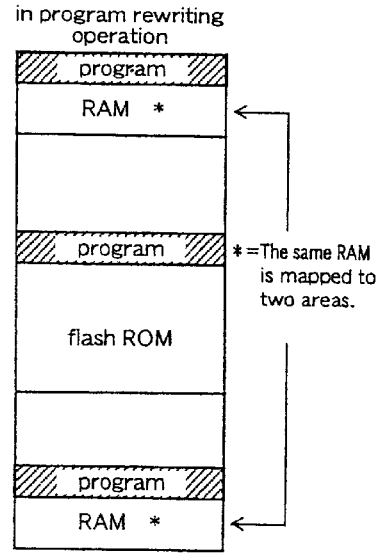

Hereunder, a preferred embodiment of the present invention will be described in detail with reference to the accompanying drawings while taking an example of a memory rewriting apparatus usable with an image forming apparatus. FIG. 1 is a block diagram of an embodiment of a memory rewriting apparatus of the present invention, and illustrates the construction of essential portions of the memory rewriting apparatus. FIG. 2($a$) is a view illustrating a memory map of a flash ROM and a RAM of a control circuit shown in FIG. 1 in the normal operation thereof. FIG. 2($b$) is a view illustrating the situation in which the contents of the flash ROM are copied into the RAM by the CPU shown in FIG. 1. FIG. 2($c$) is a view illustrating a memory map at the time when a flash ROM program is rewritten by cooperation of the CPU and the memory map switching circuit in FIG. 1. FIG. 3 is a flow chart for explaining a change in the memory maps of FIGS. 2($a$) through 2($c$).

In the memory rewriting apparatus of FIG. 1, the CPU 10 operates in the following manner in accordance with a control program given based on the present invention. That is, the CPU 10 is connected with a flash ROM 30 and a RAM 40 through the memory map switching circuit 20. The CPU 10 has a port output terminal PT a first selection output terminal CS0, a second selection output terminal CS1, and a third selection output terminal CS2. When accessing a low address in a memory map, the CPU 10 sets the logical level of the first selection output terminal CS0 to a low level (hereinafter simply referred to as an "L" level); when accessing a middle address in the memory map, the CPU 10 sets the second selection output terminal CS1 to the "L" level; and when accessing a high address, the CPU 10 sets the third selection output terminal CS2 to the "L" level Moreover, the CPU 10 sets the port output terminal PT to the "L" level in the normal operation thereof, but when the CPU 10 rewrites, upon receipt of a program update command, the flash ROM program which is a program stored in the flash ROM 30, it sets the logical level of the port output terminal PT to a high level (hereinafter referred to as an "H" level).

The CPU 10 sets the port output terminal PT to the "L" level in the normal operation thereof. Accordingly, when the CPU 10 sets the first selection output terminal CS0 to the "L" level while trying to access the low address, it can set a chip selection terminal RCS of the RAM 40 to the "L" level through an OR circuit RR1, whereby the RAM 40 can be accessed. In addition, if the CPU 10 sets the third selection output terminal CS2 to the "L" level while trying to access the high address, it can set a chip selection terminal FCS of the flash ROM 30 to the "L" level through an AND circuit AN1 and an OR circuit RR2, whereby the flash ROM 30 can be accessed. As a result, the CPU 10 recognizes that it can access the memory that is mapped as shown in FIG. 2($a$).

Upon receipt of a program update command for rewriting the flash ROM program stored in the flash ROM from the outside, the CPU 10 copies the program stored in the flash ROM 30 into the RAM 40 (step S11). Accordingly, when the memory is seen from the side of the CPU 10, it is recognized that the memory is mapped as shown in FIG. 2($b$). Next, the CPU 10 sets the port output terminal PT to the "H" level in order to rewrite the program. With this setting, if the CPU 10 sets the first selection output terminal CS0 to the "L" level while trying to access the low address, the chip selection terminal RCS of the RAM 40 can be set to the "L" level through the OR circuit RR1, so that the CPU 10 can access the RAM 40 as in the normal operation thereof.

Moreover, if the CPU 10 sets the second selection output terminal CS 1 to the "L" level while trying to access the middle address, the chip selection terminal FCS of the flash ROM 30 can be set to the "L" level through an AND circuit AN3 and the OR circuit RR2, so that the CPU 10 can access the flash ROM 30. In addition, if the CPU 10 sets the third selection output terminal CS2 to the "L" level while trying to access the high address, the chip selection terminal RCS of the RAM 40 can be set to the "L" level through an AND circuit AN2 and the OR circuit RR1, so that the CPU can access the RAM. That is, when the memory is seen from the side of the CPU 10, as shown in FIG. 2(c), the RAM 40 is allocated not only to the original low address but also to the high address where the flash ROM 30 existed until then (step S12), so that it is recognized that the flash ROM 30 has been moved to the middle address. In this state of the memory map, the CPU 10 performs the processing of rewriting the program of the flash ROM 30 in the middle address (step S13).

In rewriting the flash ROM program in the above-mentioned step S13, the CPU 10 performs the processing of rewriting the program of the flash ROM 30 moved to the middle address in accordance with a rewriting program which has been copied into the RAM 40 and allocated to the high address where the flash ROM 30 has existed until then. Thus, it appears to the CPU 10 that there is no substantial change other than the fact that the flash ROM 30 to be rewritten has moved to the middle address since the rewriting program is at the original position in the high address and the RAM 40 is also allocated to the original low address. Such simple switching of the memory maps is due to the operation of the memory map switching circuit 20 which is comprised of a simple logic element.

As is clear from the above, even when it becomes necessary for the rewriting program to access the RAM 40 by way of a program update command during the program rewriting operation, the rewriting program can access the RAM 40 as it is since the RAM 40 exists in the original or conventional position (low address). Moreover, since the memory area of the active rewriting program is different from the memory area where the program is being rewritten, even if there occurs an interrupt during the program rewriting operation, it is possible to execute the interrupt. Therefore, the memory rewriting apparatus of the present invention is advantageous in that no additional ROM except for the flash ROM is required, and an interrupt can be executed even if generated in the course of rewriting a program, thus making it unnecessary to use such a complicated program as to mutually exchange the positions of the RAM and the flash ROM with each other.

Since the memory rewriting apparatus of the present invention is constructed as described above, even if access to the RAM is needed while a program is being rewritten by the rewriting program, the RAM can be accessed as it is since the RAM exists in the original or conventional position. Moreover, since the area of the memory map of the active rewriting program is different from the area of the program being rewritten, even if an interrupt is generated during the program rewriting operation, the rewriting program, which is being run to rewrite the program, can execute the interrupt. Thus, in this memory rewriting apparatus, no additional ROM except for the flash ROM is required, and an interrupt can be executed even if generated in the course of rewriting the program, thus making it unnecessary to use such a complicated program as to mutually exchange the positions of the RAM and the flash ROM with each other.

What is claimed is:

1. A memory rewriting apparatus comprising:

copying means for copying a rewriting program stored in a nonvolatile memory into a RAM upon receipt of an instruction for rewriting said nonvolatile memory;

a RAM allocation means for allocating said RAM, into which copying is carried out by said copying means, to an area of said nonvolatile memory; and rewriting execution means for rewriting said nonvolatile memory by using said rewriting program stored in said RAM by said RAM allocation means, wherein said copying means copies said rewriting program by copying information stored in a predetermined region of said nonvolatile memory allocated for said rewriting program, and wherein said RAM allocation means allocates said RAM to the area of said nonvolatile memory such that said rewriting program stored in said RAM by said copying means is memory mapped to said predetermined region of said nonvolatile memory when said rewriting execution means performs the rewriting of the nonvolatile memory.

2. A memory rewriting apparatus comprising:

copying means for copying, upon receipt of an instruction for rewriting a nonvolatile memory, a rewriting program stored in said nonvolatile memory into a first area of a RAM;

RAM allocation means for allocating said RAM, into which copying is carried out by said copying means, to an area of said nonvolatile memory;

rewriting execution means for rewriting said nonvolatile memory by using said rewriting program stored in said RAM allocated by said RAM allocation means; and use permission means for permitting a second area of said RAM to be used as a RAM area upon execution of rewriting by said rewriting execution means, wherein said copying means copies said rewriting program by copying information stored in a predetermined region of said nonvolatile memory allocated for said rewriting program, and wherein said RAM allocation means allocates said RAM to the area of said nonvolatile memory such that said rewriting program stored in said RAM by said copying means is memory mapped to said predetermined region of said nonvolatile memory when said rewriting execution means performs the rewriting of the nonvolatile memory.

3. A memory rewriting apparatus including at least a CPU, a RAM and a nonvolatile memory which stores therein nonvolatile memory programs including various control programs and a rewriting program for rewriting the various control programs, wherein said apparatus rewrites, upon receipt of a program update command requesting rewriting of the nonvolatile memory programs from the outside, the nonvolatile memory programs by using the stored rewriting program, wherein said apparatus comprises:

memory map switching means connected with said CPU, said RAM and said nonvolatile memory and adapted to allocate said RAM and said nonvolatile memory to a memory map for a normal operation when it receives from said CPU an instruction indicative of a normal operation time other than a program rewriting operation time, and allocate, upon receipt of an instruction indicative of a program rewriting operation time, said RAM not only to said memory map area but also to another memory map area to which said nonvolatile memory is allocated in the normal operation while moving said nonvolatile memory to a memory map area other than said two memory map areas in which said RAM is allocated; and rewriting execution means adapted to operate in such a manner that said CPU can copy into said RAM the nonvolatile memory programs stored in said nonvolatile memory that is in a memory map for the normal operation, then generate an instruction indicative of a program rewriting operation, and rewrite the nonvolatile memory programs in said nonvolatile memory which has been moved to said memory map area other than said two memory map areas where said RAM is allocated, in accordance with the rewriting program copied into said RAM allocated to the nonvolatile memory area for the normal operation.

4. A memory rewriting apparatus comprising:

copying means for copying, upon receipt of an instruction for rewriting a nonvolatile memory, a rewriting program stored in said nonvolatile memory into a first area of a RAM;

RAM allocation means for allocating said RAM, into which copying is carried out by said copying means, to an area of said nonvolatile memory;

rewriting execution means for rewriting said nonvolatile memory by using said rewriting program stored in said RAM allocated by said RAM allocation means; and use permission means for permitting a second area of said RAM to be used as a RAM area upon execution of rewriting by said rewriting execution means, wherein said nonvolatile memory comprises a flash ROM, said CPU has a port output terminal and a first through a third selection output terminal; said memory map switching means is connected, on one hand, with said port output terminal and said first through third selection output terminals of said CPU, respectively, and, on the other hand, with said flash ROM and said RAM, respectively; said rewriting execution means comprises a rewriting execution control program given to said CPU; said CPU sets its port output terminal and its first through third selection output terminals in such a manner that said port output terminal is set to a first logic at the time of the normal operation, and to a second logic at the time of rewriting said flash ROM program with the rewriting execution control program, and said first selection output terminal is set to the first logic when a low address area is selected, and to the second logic when non-selection is made, and said second selection output terminal is set to the first logic when a middle address area is selected, and to the second logic when non-selection is made, and said third selection output terminal is set to the first logic when a high address area is selected, and to the second logic when non-selection is made; and in the case where said port output terminal is set to the first logic, said memory map switching means permits the access of said CPU to said RAM when said first selection output terminal is set to the first logic, refuses the access of said CPU to the flash ROM or said RAM in accordance with the logic of said second selection output terminal, and permits the access of said CPU to said flash ROM when said third selection output terminal is set to the first logic, whereas in the case where said port output terminal is set to the second logic, said memory map switching means permits the access of said CPU to said RAM when said first selection output terminal is set to the first logic, and permits the access of said CPU to said RAM when said third selection output terminal is set to the first logic.

5. The memory rewriting apparatus according to claim 4, wherein said memory map switching means comprises a logical circuit which is connected at its input side with said port output terminal and said first through third selection output terminals, and at its output side with said RAM and said flash ROM.

6. A memory rewriting apparatus, comprising:

a RAM;

a non-volatile memory that is configured to store a rewrite program; and a memory map switch circuit configured to map memory addresses of the RAM and the non-volatile memory for access by a processor, wherein, in a first mode of operation, said memory map switch circuit is configured to allocate a first memory map address region to said RAM and a second memory map address region to said non-volatile memory, wherein said processor is configured to copy said rewrite program stored in said non-volatile memory into said first memory map address region of said RAM upon receipt of an externally-supplied program update command sent to said processor, wherein, in a second mode of operation, said memory map switch circuit is configured to allocate the first memory map address region to said RAM and the second memory map address region to said RAM, so that said RAM is mapped to two separate address regions, and said memory map switch circuit allocates a third memory map address region to said non-volatile memory, said third memory map address region being an address region separate from said first and second memory map address regions, wherein said processor rewrites information of the non-volatile memory stored in the third memory map address region based on the rewrite program of the RAM stored in the first memory map address region, and wherein said memory map switch circuit operates in either the first mode of operation or the second mode of operation based on a control signal provided by said processor.

7. A memory rewriting method, comprising:

a) allocating a first memory map address region to a non-volatile memory and a second memory map address region to a RAM, wherein a rewrite program is stored in the non-volatile memory;

b) receiving, by a CPU that can access the RAM and the non-volatile memory, a program update command for updating the rewrite program;

c) copying, by the CPU, the rewrite program stored in the non-volatile memory, to the RAM;

d) performing a rewrite operation by the CPU executing the rewrite program in order to rewrite the non-volatile memory, wherein a memory map reallocation operation is performed in which the non-volatile memory is mapped to a third memory map address region separate from the first and second memory map address regions, and in which the RAM is mapped to both the first memory map address region and the second memory map address region, wherein the rewrite program copied to the RAM during the step c) is memory mapped to a same address space as it was memory mapped when stored in the non-volatile memory in the step a).

8. The method according to claim 7, further comprising:

e) receiving an external interrupt by the CPU while step d) is being performed, wherein the external interrupt requires access to the RAM; and f) halting the rewrite operation and accessing the RAM in a normal operation mode by way of the first memory map address region; and g) after the external interrupt has been fulfilled, restarting the rewrite operation at a position that was left off when the rewrite operation was halted in the step f).

* * * * *